UNITED STATES PATENT OFFICE.

ALBERT VERLEY, OF PARIS, AND EDOUARD URBAIN AND ANDRÉ FEIGE, OF GENTILLY, FRANCE.

PROCESS OF OXIDIZING CAMPHOL FOR THE MAKING OF CAMPHOR.

No. 908,171.      Specification of Letters Patent.      Patented Dec. 29, 1908.

Application filed August 21, 1907. Serial No. 389,585.

*To all whom it may concern:*

Be it known that we, ALBERT VERLEY, EDOUARD URBAIN, and ANDRÉ FEIGE, citizens of the Republic of France, and residents, the first of 27 Rue Notre-Dame de Nazareth, Paris, and the two others of Avenue de la République, Gentilly, Seine, in the said Republic, chemists, have invented a new and useful Process for Oxidizing Camphol for the Manufacture of Camphor, of which the following is a specification.

This invention relates to a process for oxidizing camphol for the manufacture of camphor.

It is known that all oxidizing agents transform camphol into camphor, but it is very difficult to avoid formation of products of oxidation of the camphor itself. The process according to this invention avoids the formation of such products by using as the oxidizing agent a chromic acid mixture which is active in the cold. It is known that sulfuric acid can form several combinations with chromic acid; these combinations part with their oxygen in the cold with the greatest facility in presence of oxidizable matters.

A very active combination is produced by making a mixture under the following special conditions: 50 parts of sodium bichromate are dissolved in 50 parts of water. After dissolution there are added 68 parts of sulfuric acid of 66° Baumé specific gravity. The following equation is realized:—

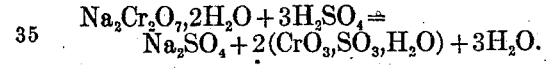

$$Na_2Cr_2O_7, 2H_2O + 3H_2SO_4 = Na_2SO_4 + 2(CrO_3, SO_3, H_2O) + 3H_2O.$$

The camphol is dissolved in any non-oxidizable solvent, preferably carbon tetrachlorid, $CCl_4$, in the proportion of about 400 kilograms of tetrachlorid to 100 kilograms of camphol because after oxidation the solution containing the camphor will be at the lower part of the mixer wherein the oxidation is effected, and this solution need merely be drawn off.

The chromic acid mixture, prepared as above, is diluted with water until it has become six times its original volume. The solution of camphol is added, in such proportion that the excess of the chromic acid mixture is one-third of that theoretically required. After agitating for two hours, the oxidation is at an end; the solution of camphor is separated and there is added to the solution of the spent chromic acid mixture (spent to the extent of two-thirds) the theoretical quantity of the undiluted mixture prepared as aforesaid, the said theoretical quantity being relative to the weight of camphol to be oxidized. In this manner the same liquid can be used over again until saturated with chromium sulfate, or until the degree of concentration is 35° Baumé cold. The yield of camphor by this process is about 88 to 90 per cent. of the volume of camphol.

What we claim as our invention is:—

The process of producing a solution of camphor from camphol which consists in, dissolving sodium bichromate in water and adding sulfuric acid; dissolving camphol in a non-oxidizable solvent; diluting the first solution with water; adding the camphol solution; agitating the mass in the cold and separating the camphor.

In testimony, that we claim the foregoing as our invention, we have signed our names in presence of two witnesses, this 7th day of August 1907.

ALBERT VERLEY.
           EDOUARD URBAIN.
           ANDRÉ FEIGE.

Witnesses:
    DEAN B. MASON,
    ALCIDE FABE.